Oct. 25, 1938. H. HARVEY 2,134,187
TYING MACHINE
Filed July 12, 1937. 14 Sheets-Sheet 1

Inventor
Herbert Harvey
By Lyon & Lyon
Attorneys

Oct. 25, 1938.　　　H. HARVEY　　　2,134,187
TYING MACHINE
Filed July 12, 1937　　　14 Sheets-Sheet 2

Inventor
Herbert Harvey
By Lyon & Lyon
Attorneys

Oct. 25, 1938.  H. HARVEY  2,134,187

TYING MACHINE

Filed July 12, 1937  14 Sheets-Sheet 3

Inventor
Herbert Harvey
By Lyon & Lyon
Attorneys

Oct. 25, 1938.  H. HARVEY  2,134,187
TYING MACHINE
Filed July 12, 1937  14 Sheets-Sheet 4

Inventor
Herbert Harvey
By Lyon & Lyon
Attorneys

Oct. 25, 1938.　　　H. HARVEY　　　2,134,187
TYING MACHINE
Filed July 12, 1937　　　14 Sheets-Sheet 5
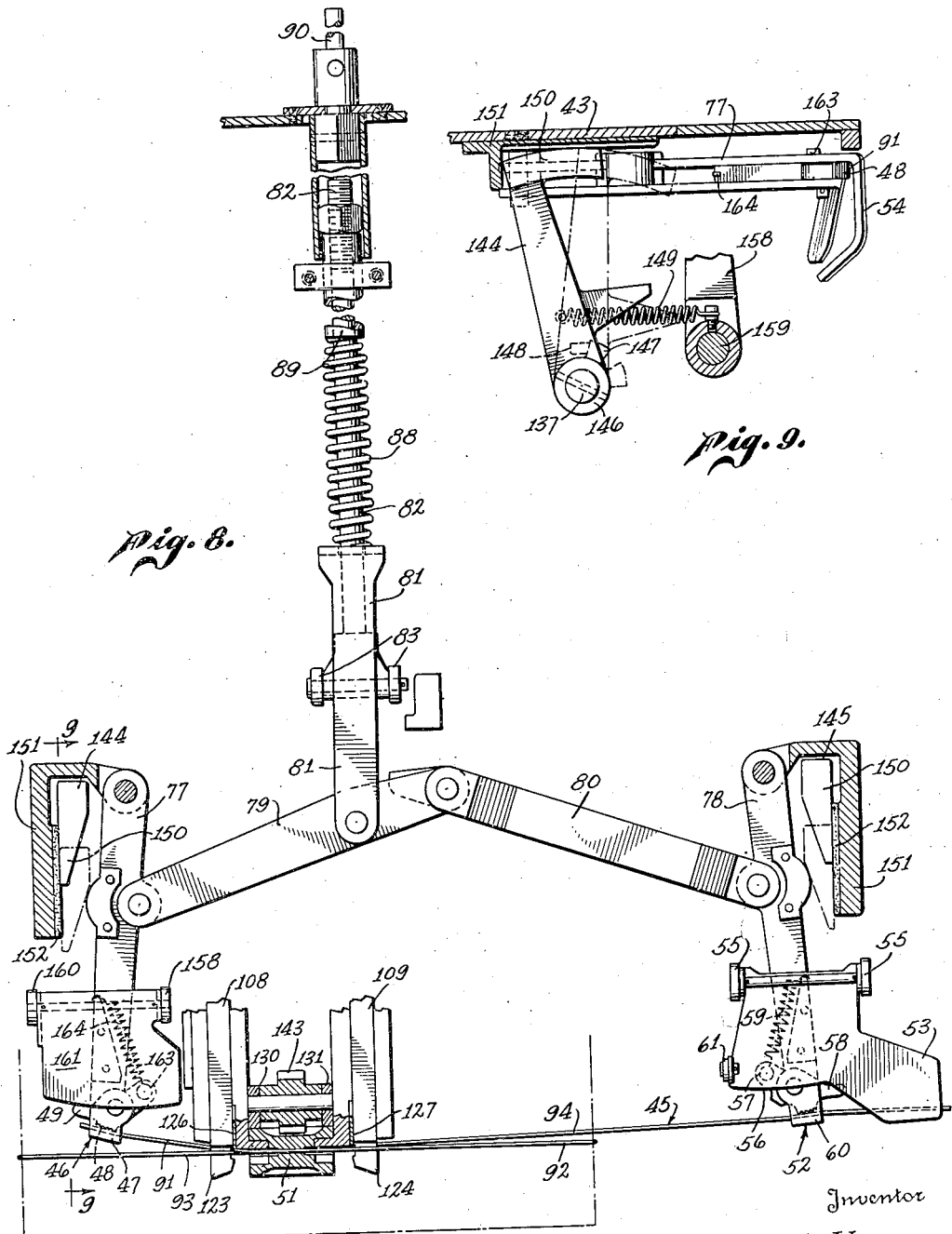
Inventor
Herbert Harvey
By Lyon & Lyon
Attorneys

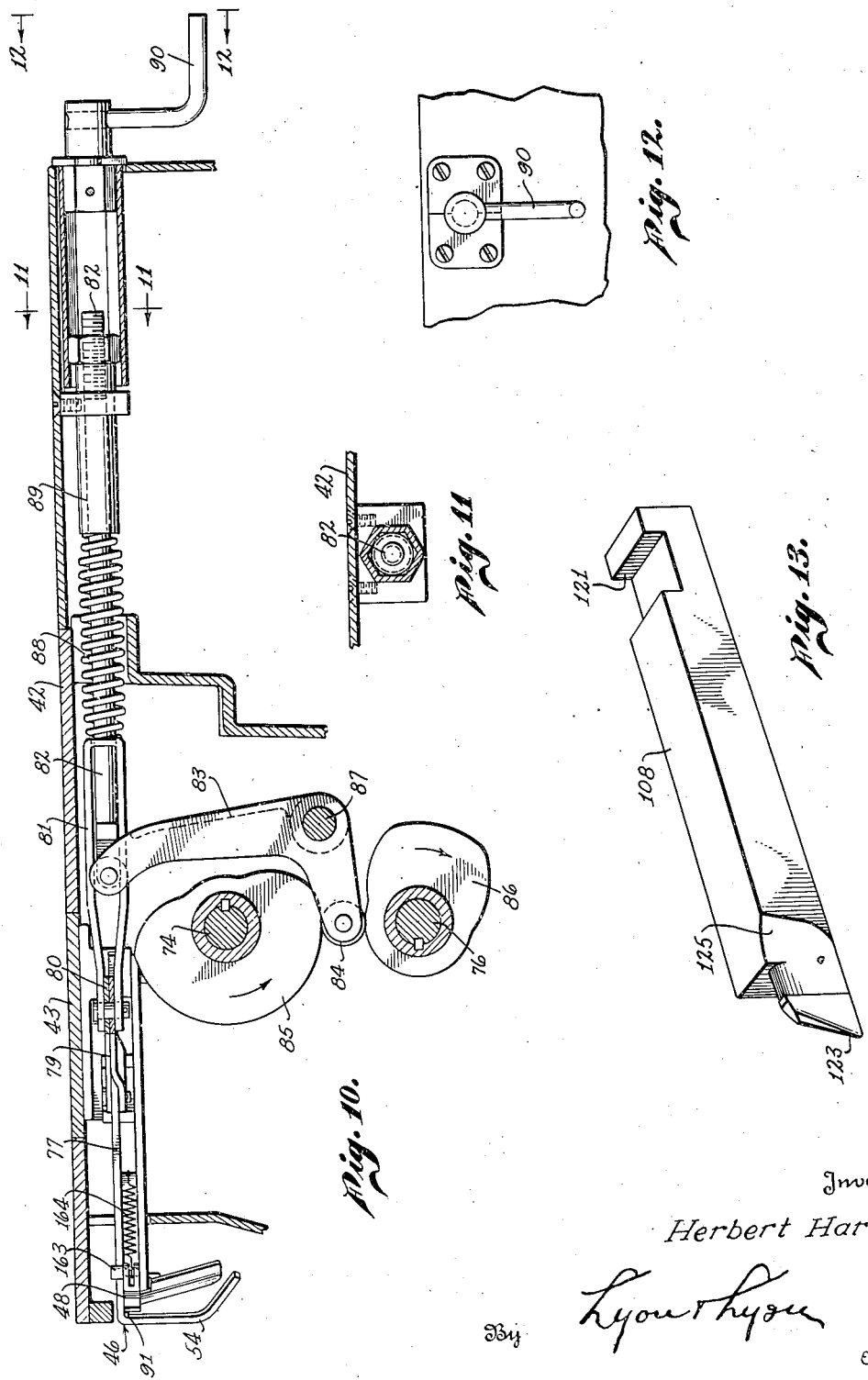

Oct. 25, 1938.  H. HARVEY  2,134,187
TYING MACHINE
Filed July 12, 1937  14 Sheets-Sheet 7

Inventor
Herbert Harvey
By Lyon & Lyon
Attorneys

Oct. 25, 1938.  H. HARVEY  2,134,187
TYING MACHINE
Filed July 12, 1937   14 Sheets-Sheet 9

Inventor
Herbert Harvey
By Lyon & Lyon
Attorneys

Oct. 25, 1938.                    H. HARVEY                    2,134,187
                                 TYING MACHINE
                          Filed July 12, 1937        14 Sheets-Sheet 10

Inventor
Herbert Harvey
By Lyon & Lyon
Attorneys

Oct. 25, 1938.                H. HARVEY                  2,134,187
                             TYING MACHINE
                         Filed July 12, 1937        14 Sheets-Sheet 11

Inventor

Herbert Harvey

By Lyon & Lyon

Attorneys

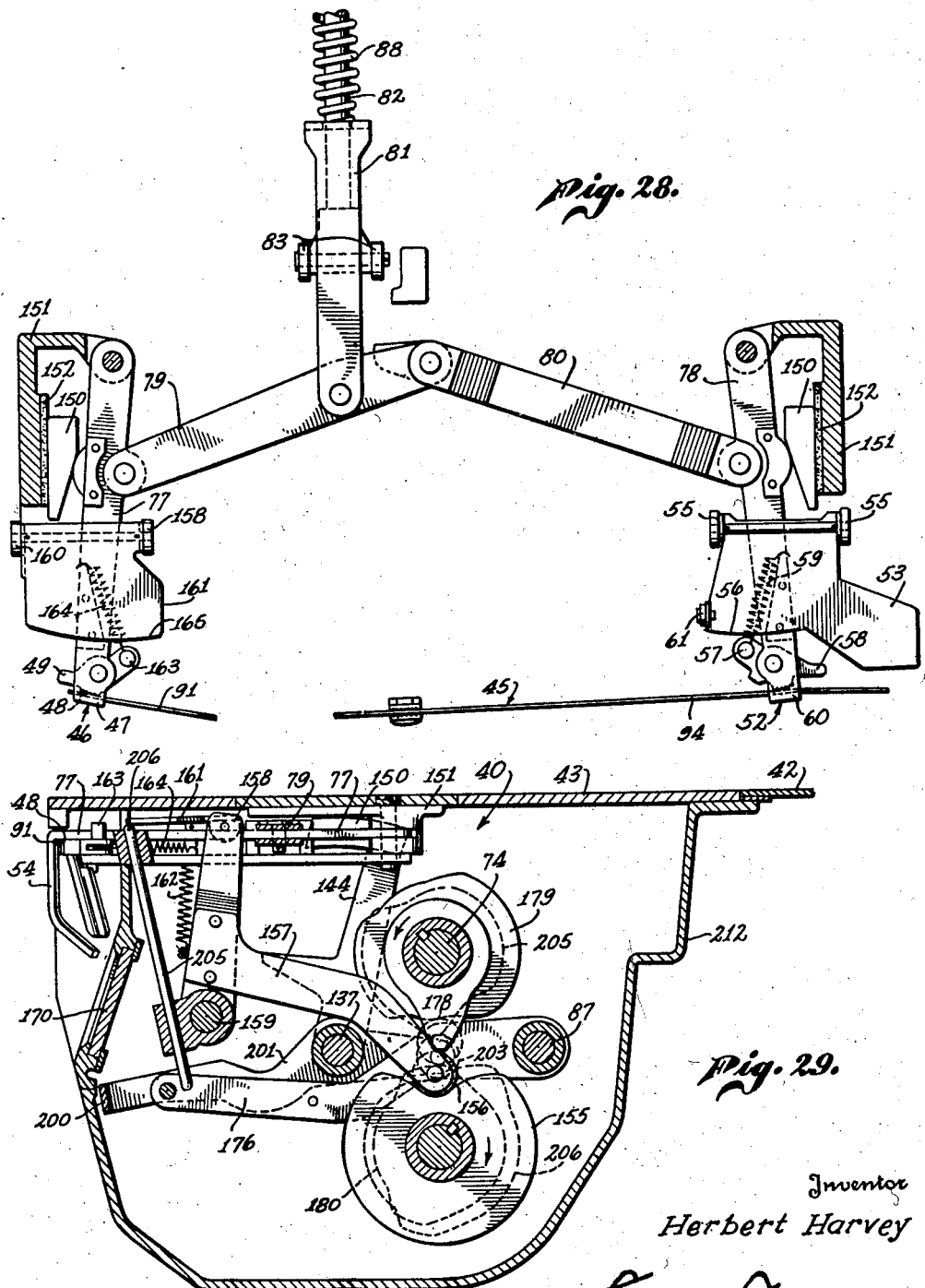

Patented Oct. 25, 1938

2,134,187

UNITED STATES PATENT OFFICE 2,134,187

TYING MACHINE

Herbert Harvey, Los Angeles, Calif., assignor, by mesne assignments, to The Gerrard Company, Incorporated, Chicago, Ill., a corporation of Delaware Application July 12, 1937, Serial No. 153,118

14 Claims. (Cl. 140—93)

This invention relates to a machine for wire binding boxes, cartons or bundles formed of a plurality of objects and especially to certain new and improved mechanical features incorporated in such machine.

It is one of the principal objects of this invention to provide an improved form of threading device which is operative for taking hold of the supply portion of the tie wire at the completion of the tying operation when the supply wire is severed from the formed tie and carrying the cut end of the supply wire forwardly and presenting it to a first gripping means.

A further object is to provide appropriate operating means for actuating the threading device in timed relation with the other operating elements and devices of the machine.

A further object is to arrange the threading device to complete its threading operation just prior to the stopping of the machine, whereby the machine will be automatically rendered ready for the next tying operation.

A further object is to provide means for positively actuating the several operative elements of the machine without resorting to spring means for actuating said elements through a portion of the operating cycle.

A further object is to provide a tying machine which will be positive, smooth and rapid in its operation and which will require a minimum of attention from the operator, and which machine will be easily and quickly manipulated.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification and that variations therefrom in details of construction or arrangement of parts may accordingly be effected and yet remain within the spirit and scope of the invention as the same is set forth in the appended claims.

In the drawings:

Figure 8 illustrates a fragmental plan view partially in section of the wire tensioning, tying, severing and tensioning locking means of the invention.

Figure 9 illustrates a fragmental sectional view taken substantially in the plane of line 9—9 of Figure 8.

Figure 10 illustrates a fragmental sectional view taken substantially in the plane of line 10—10 of Figure 3.

Figure 11 illustrates a sectional view taken substantially in the plane of line 11—11 of Figure 10.

Figure 12 is a fragmental elevational view taken substantially in the plane of line 12—12 of Figure 10.

Figure 13 illustrates in perspective one of the wire spreading, severing and tie ejecting members.

Figure 22A:
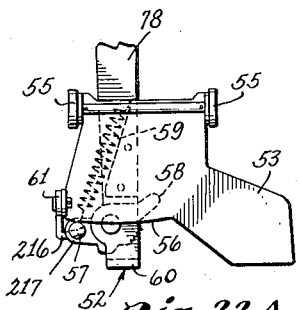
Figure 22 illustrates a fragmental view taken substantially in the plane of line 22—22 of Figure 19 to illustrate the clutch control mechanism.
Figure 22:
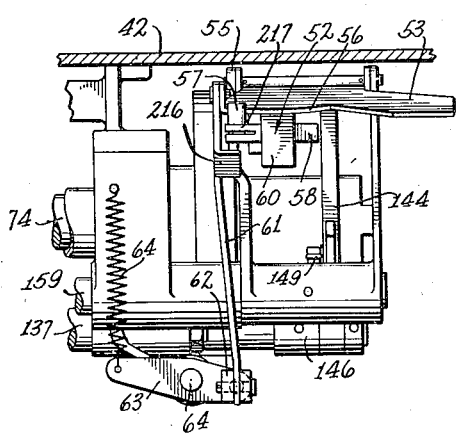
Figure 22B:
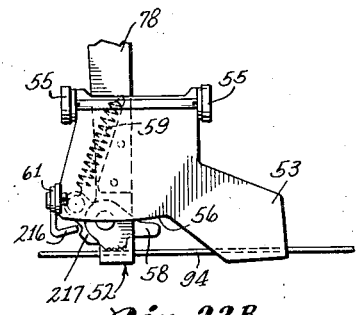

Figure 22—A is a fragmental plan view illustrating the second gripper as it would appear when maintained in its open position by means of its latch plate, and the manner in which the spring engaging end of the gripper overlies the interlocking finger extending outwardly from the clutch control link, whereby the driving clutch of the machine cannot be actuated to start the machine upon an operating cycle until after the gripper has been released.

Figure 22—B illustrates a view similar to that of Figure 22—A but shows the gripper released from its latch plate and the manner in which the spring engaging end of the gripper moves out of the path of the inter-locking finger of the clutch control link.

Figure 3:
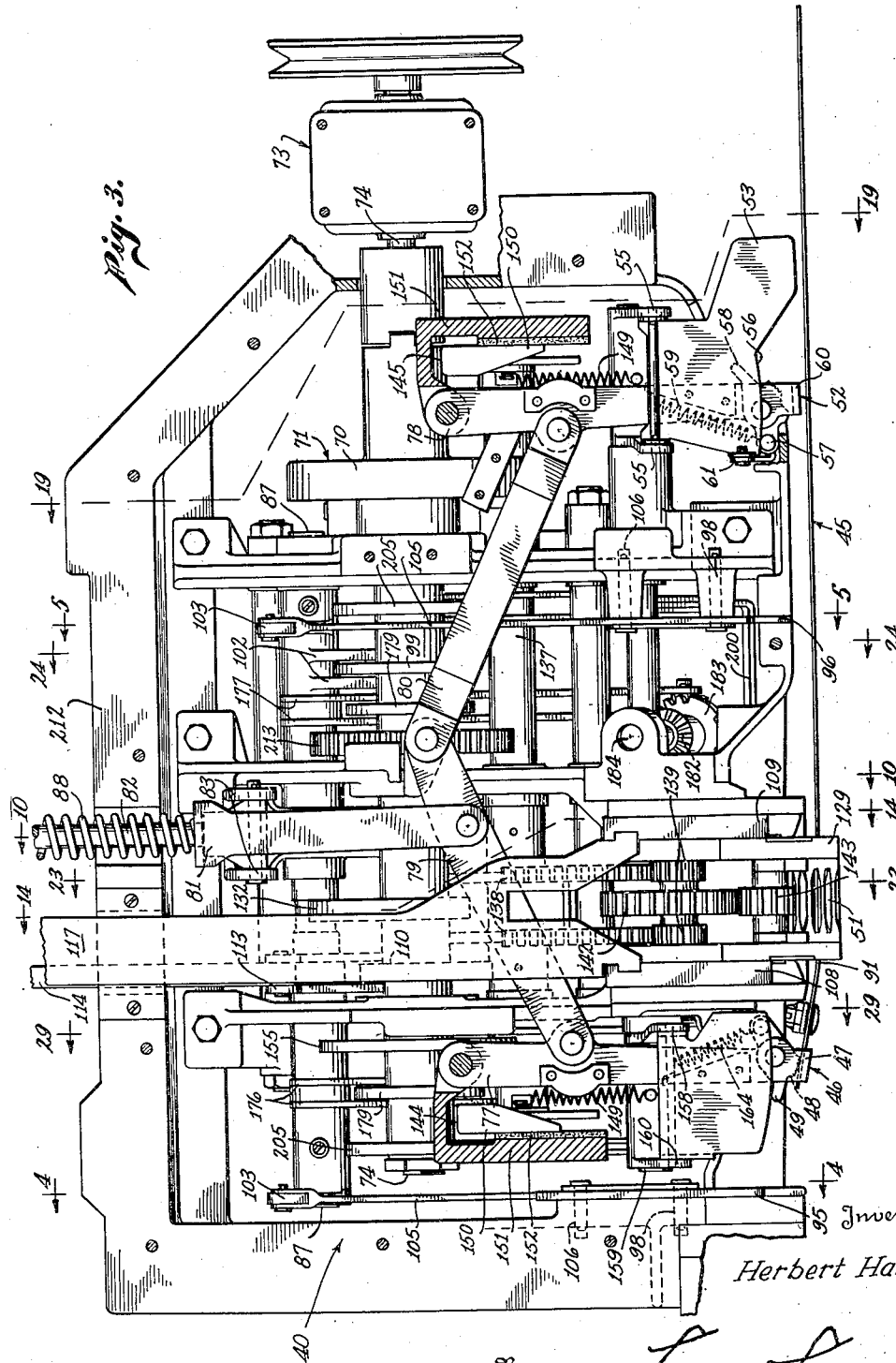
Figure 3 illustrates a fragmental plan view of Figure 1, with the bundle supporting surface or cover of the machine removed to show the operating elements of the machine.
Figure 23:
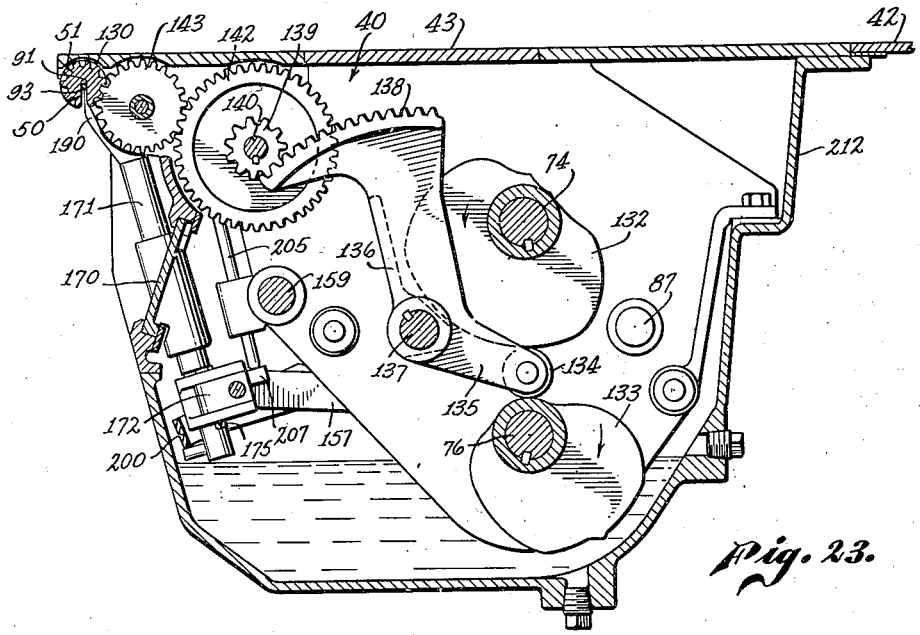

Figure 23 illustrates a sectional view taken substantially in the plane of line 23—23 of Figure 3, to show the driving mechanism for the twister pinion.

Figure 24:
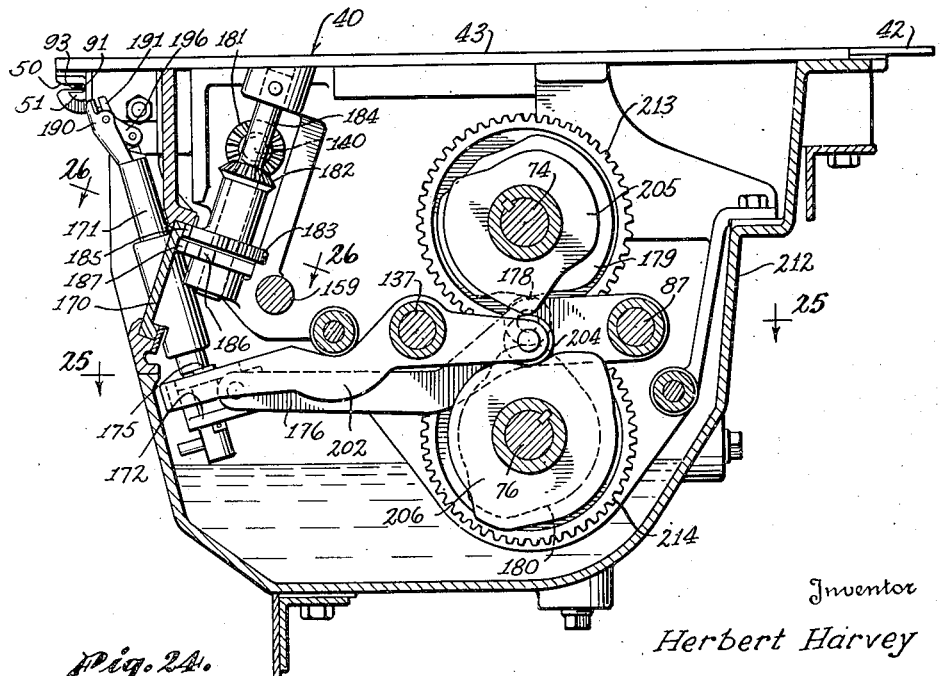

Figure 24 illustrates a sectional view taken substantially in the plane of line 24—24 of Figure 3 to show the threading device and its operating mechanisms.

Figure 25:
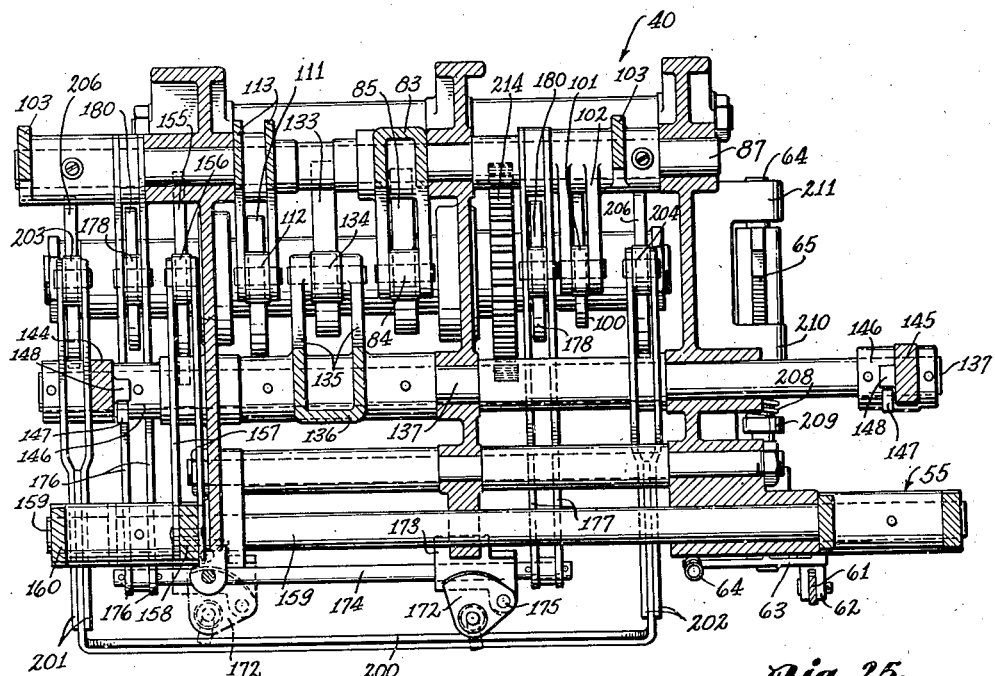

Figure 25 is a sectional view taken substantially in the plane of line 25—25 of Figure 24.

Figure 26:
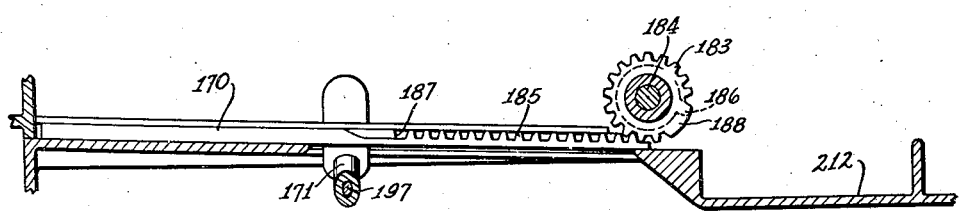

Figure 26 illustrates a fragmental sectional view taken substantially in the plane of line 26—26 of Figure 24 to show the threading device carriage at one end of its travel.

Figure 27:
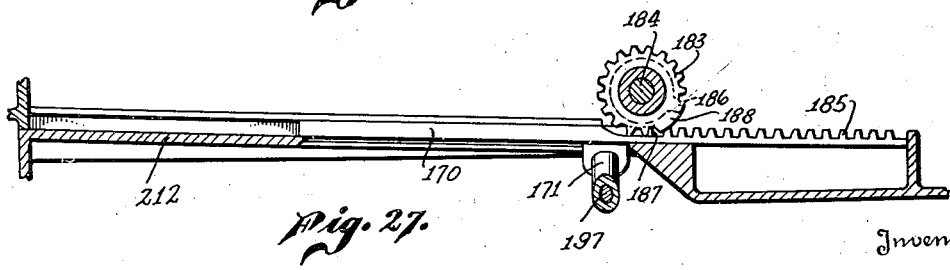

Figure 27 is a view similar to that of Figure 26 but showing the carriage at the opposite end of its travel.

Figure 28 illustrates a fragmental plan view, partially in section, of the wire tensioning mechanism and its locking means as these means would appear at the end of the tensioning operation.

Figure 29 illustrates a sectional view taken substantially in the plane of line 29—29 of Figure 3.

Figure 30:
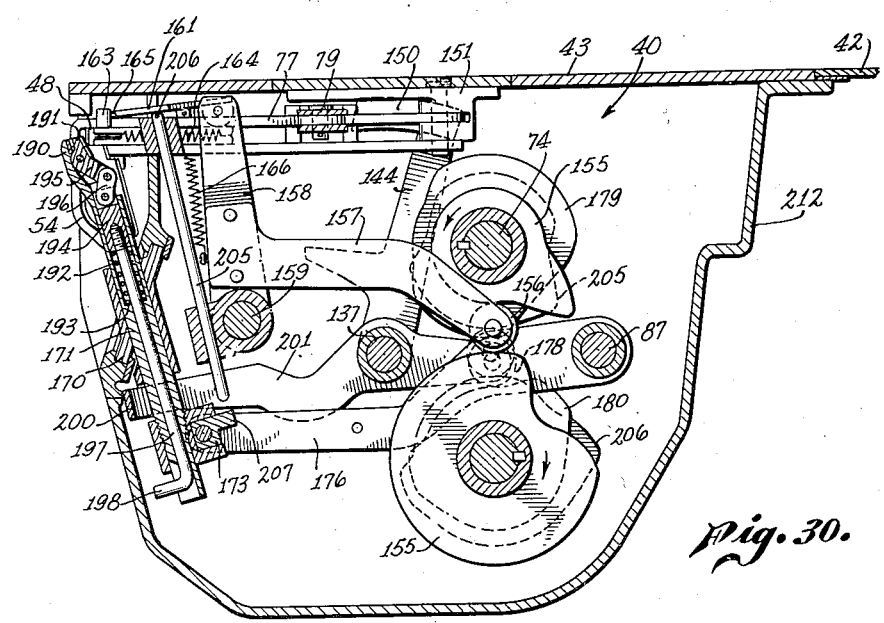

Figure 30 illustrates a sectional view similar to that of Figure 29 but illustrating the parts in the position they would occupy when the first gripper is mechanically opened and the shuttle gripper of the threading device has moved to present the cut end of the supply wire to the first gripper.

Figure 31:
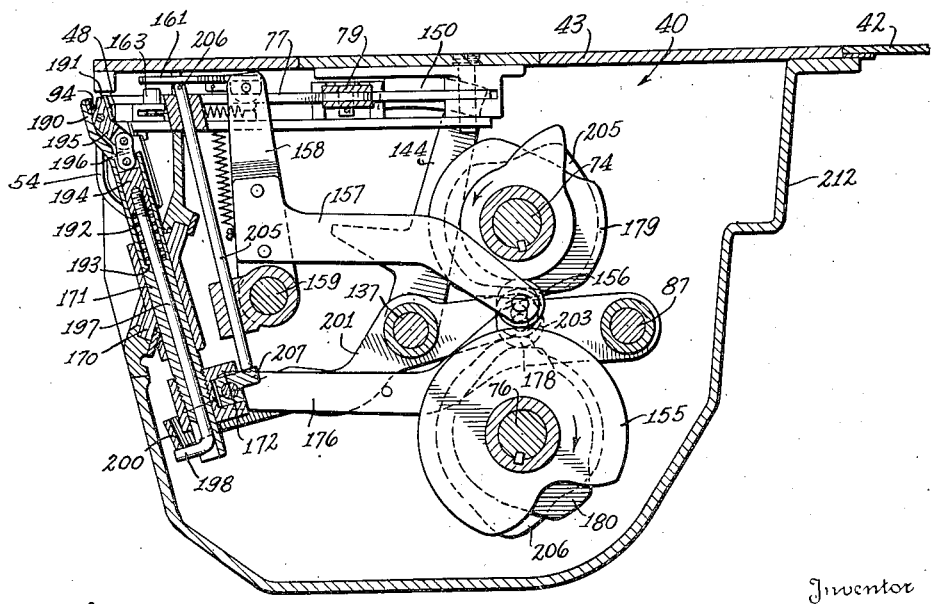

Figure 31 illustrates a sectional view similar to that of Figures 29 and 30 but differs therefrom in showing the release of the first gripper to grab the cut end of the wire presented thereto by the shuttle gripper of the threading device, and the means for opening the shuttle gripper to release the wire carried thereby.

Figure 32:
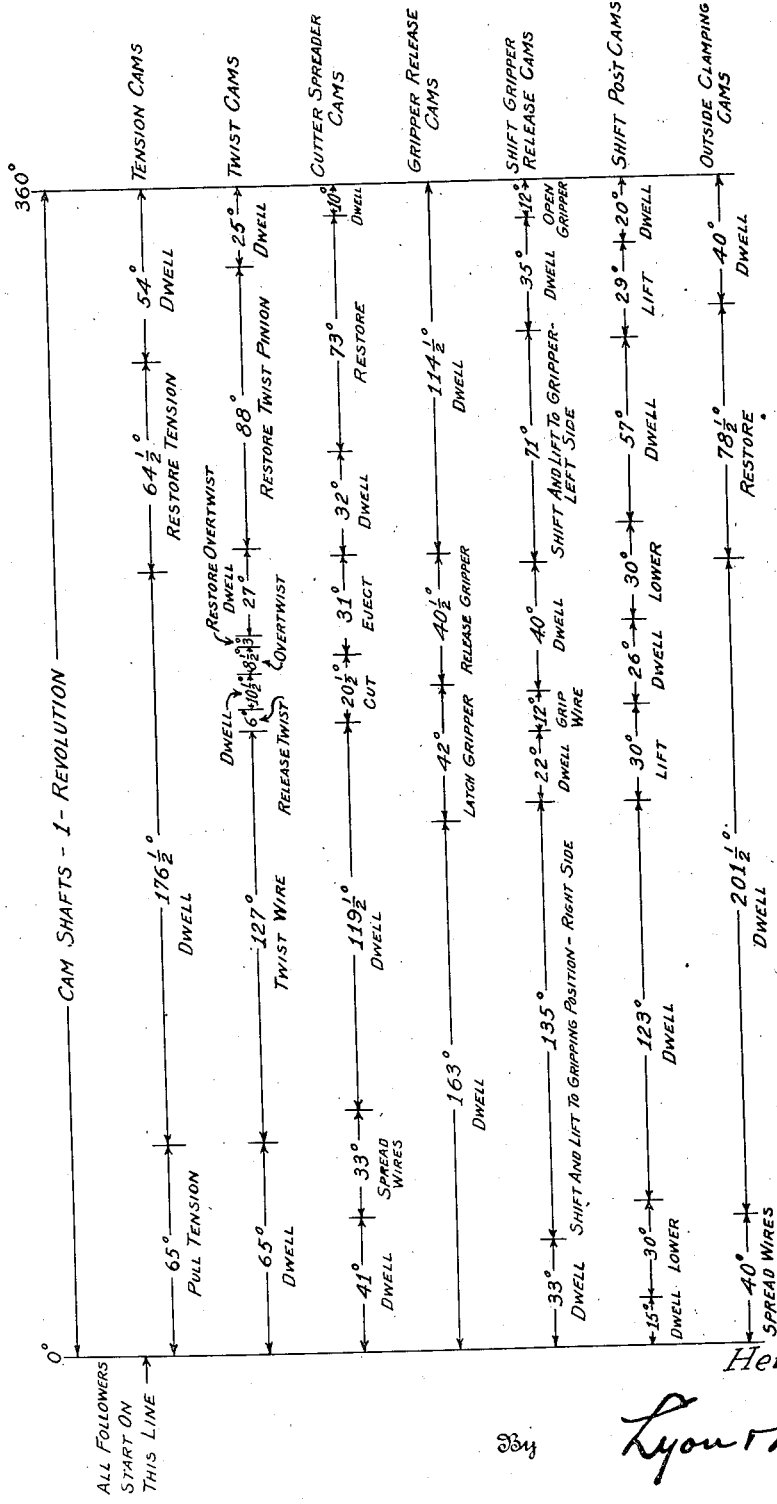

Figure 32 is the diagrammatic representation of the several operating cams of the machine, showing their sequence of operation in relation to one full operating cycle of the machine.

The tying machine of this invention, generally referred to by the reference number 40, is a self-contained unit and for convenience of operation may be mounted upon a suitable supporting table 41, which table may form a portion of a conveyor if preferred, however, for the purpose of illustration, a common form of table is illustrated.

Figure 1:
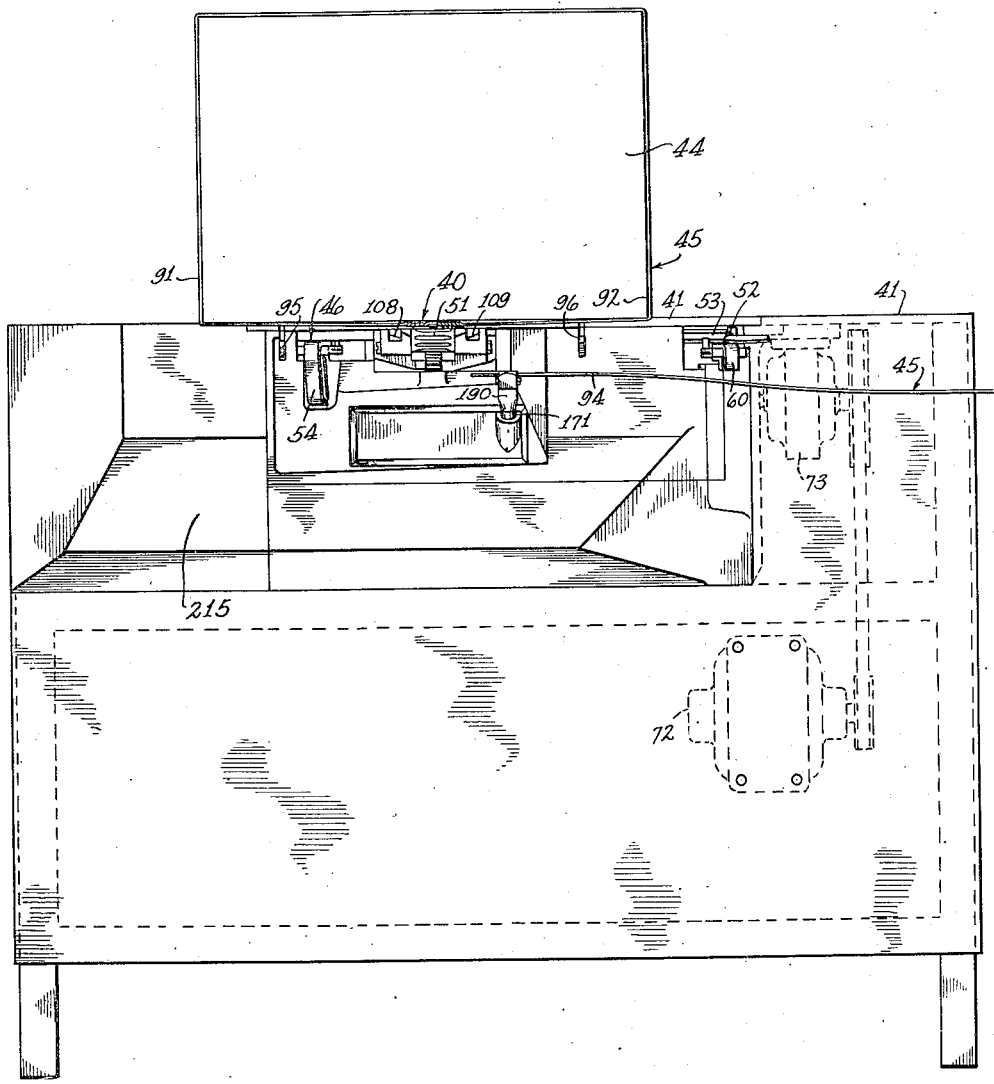
Figure 1 illustrates a front elevation of the machine and showing the machine just after a tie has been completed and the threading device carrying the cut end of the supply wire to the first gripper.
Figure 2:
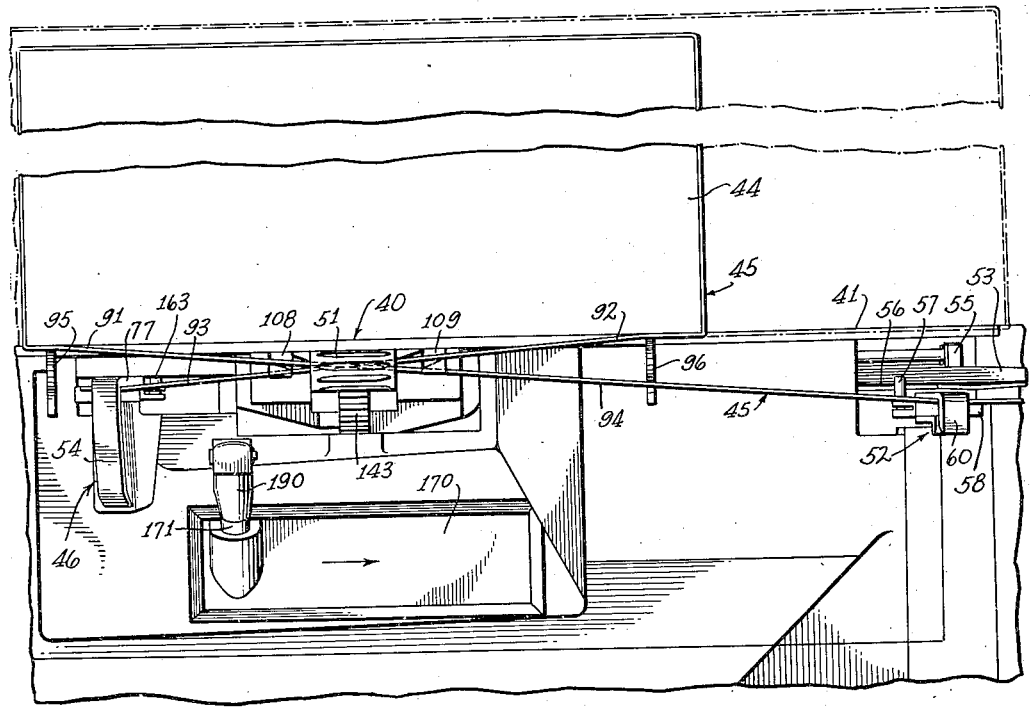
Figure 2 is a partial elevational view similar to that of Figure 1, with the exception that the parts are shown in the position they would occupy at the instance the machine is placed in operation.
Figure 4:
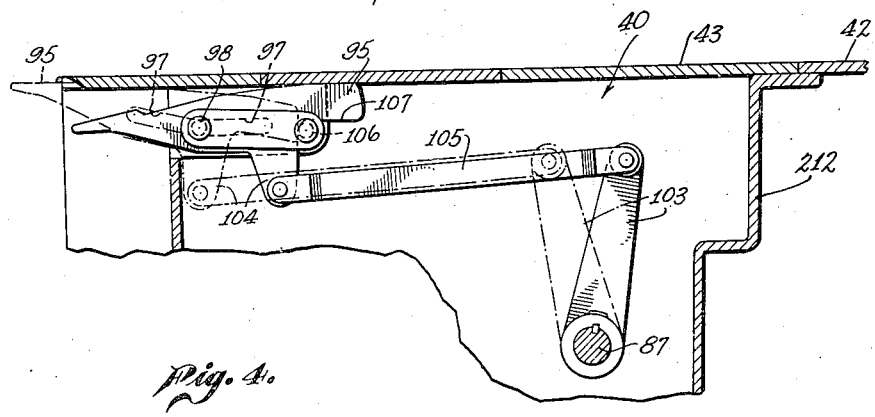
Figure 4 illustrates a fragmental sectional view taken substantially in the plane of line 4—4 of Figure 3.

As may be observed in Figures 1, 2 and 4, the tying machine of this invention is mounted upon the under surface of the table surface 42 in such manner that the cover plate 43 is flush or substantially flush with the table surface in order that cartons, boxes or other articles to be tied may be conveniently slid across the table surface 42 and across the cover plate 43 into correct tying position. Such an article is illustrated in Figures 1 and 2 by the reference number 44.

In the operation of the machine a supply of wire for the purpose of forming the tie is supplied from a reel, or some other source, and the free end of the supply wire 45 (Fig. 3) will be presented to the first gripper 46 and securely gripped therein in the following manner. As may be observed in this figure, the gripper 46 includes a first gripper anvil 47 and a pivoted gripper jaw 48 having a thumb piece 49, by means of which the gripper jaw may be swung to its retracted position against the action of the gripper spring 164. With the gripper jaw so maintained in its open position, the free end of the supply wire 45 will be inserted between the anvil and jaw whereupon, by releasing the gripper jaw, the tie wire will be securely clamped between the jaw and anvil. As is found in practice, the gripping jaw is pivoted eccentric to its gripping surface, which surface is usually held in contact with the tie wire by the spring means 164 whereby a pull on the wire to the right, as viewed in Figure 3, will tend to tighten the hold of the gripper upon the wire.

It will be understood that the wire need be placed manually in the first gripper only when a new supply of tie wire is to be threaded into the machine and that by means of an automatic threading device at the end or substantially the end of each tying cycle the cut end of the supply wire will be automatically rethreaded into the first gripper.

With the machine now ready for use, the operator will place an article such as a carton or box 44 in tying position and thereafter will manually loop the tie wire about the object. In doing so, the tie wire will first pass into the wire receiving slot 50 of the twister pinion 51 and then around the object 44 and through the wire receiving slot 50 of the twister pinion for a second time. In wrapping the wire around the object the operator will manually pull the wire reasonably taut, that is to take up any slack in the wire, and will next place the tie wire in or between the fixed and active jaws of the second gripper 52, which second gripper is of substantially the same construction as that of the first gripper. The second gripper is normally maintained in an open position to receive the tie wire and is automatically released into gripping relation with the wire by the hand of the operator engaging the second gripper latch plate 53.

Figure 14:
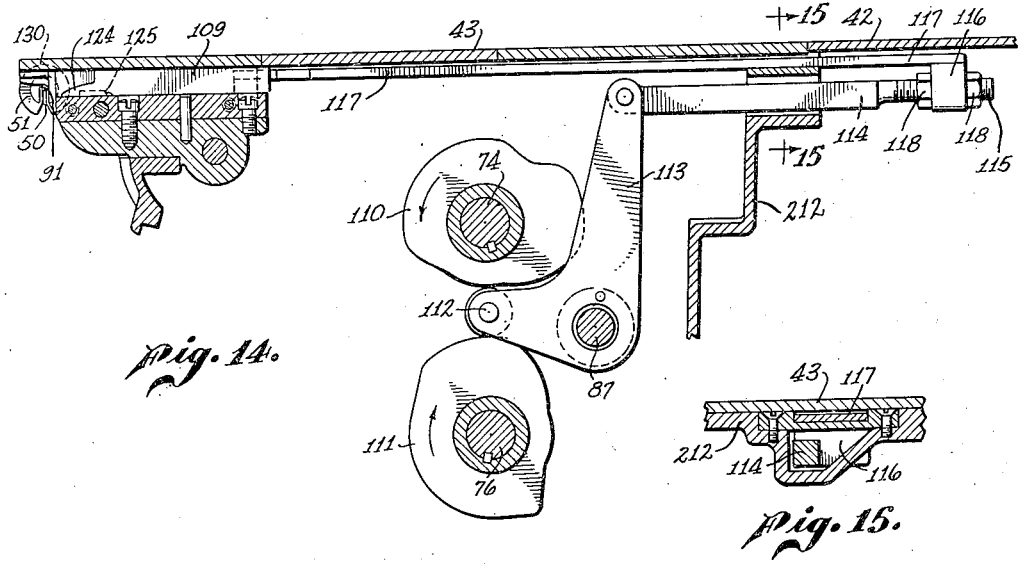
Figure 14 illustrates a fragmental sectional view taken substantially in the plane of line 14—14 of Figure 3.
Figure 15:
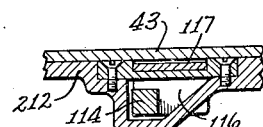
Figure 15 is a fragmental sectional view taken substantially in the plane of line 15—15 of Figure 14.

As will be observed in Figures 3, 14 and 23, the wire receiving slot 50 of the twister pinion 51 is directed downwardly in order that the wire may be directly wrapped into the slot during the placing of the wire about the object, and it may be also observed in these figures that the twister pinion is positioned outwardly from the machine, thus greatly facilitating the placing of the tie wire about the object and within the twister slot. To assist in guiding the tie wire into the twister slot during the wire placing operation, the first gripper anvil 47 is provided with a downwardly and inwardly extending guide finger 54 (Fig. 10) and the outer surface of the automatic wire threading device will also act to assist the wire in entering the twister pinion slot. In this particular, note Figures 2 and 23.

Figure 19:
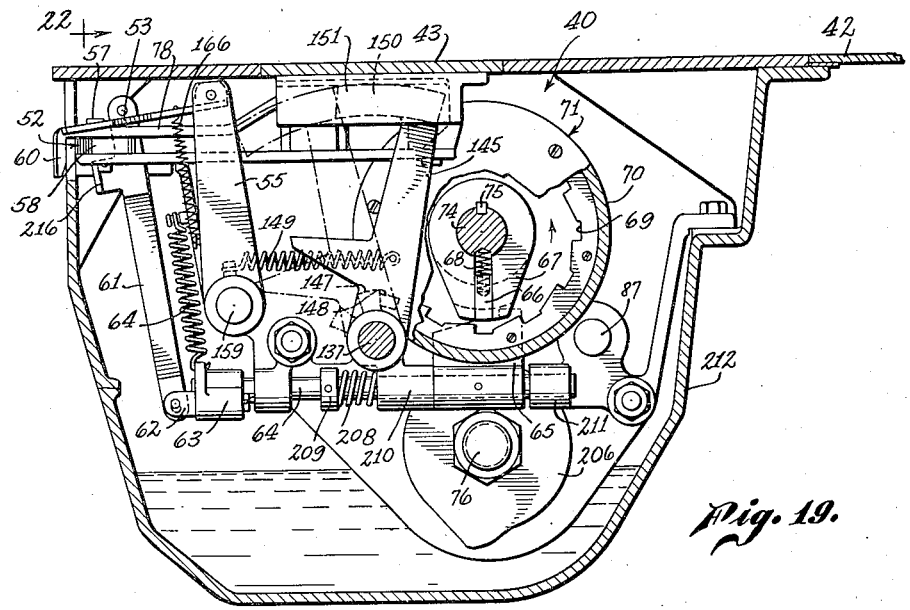
Figure 19 illustrates a sectional view taken substantially in the plane of line 19—19 of Figure 3 to show the second gripper and the clutch and clutch control means wherein the gripper is illustrated as being held open by its latch plate and the clutch maintained in its inactive position.
Figure 20:
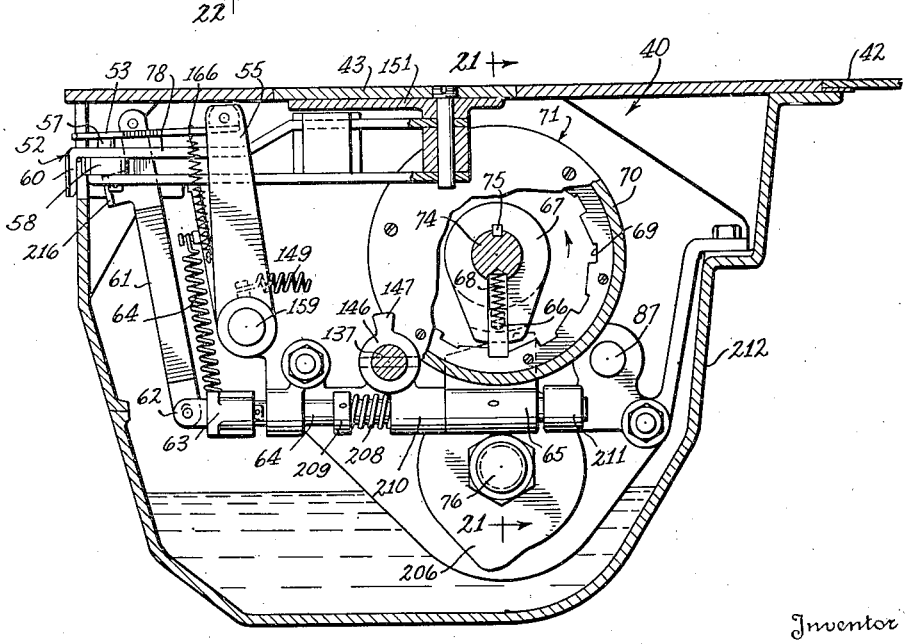
Figure 20 illustrates a view similar to Figure 19 but showing the second gripper as it would appear when released from its latch plate to grab the tie wire presented thereto and the clutch control mechanism actuated to release the clutch for operating the machine through a complete tying cycle.

As previously stated, the second gripper is maintained in its open position until the operator lifts the latch plate 53 during the completion of the wire placing operation. The latch plate 53 is pivotally mounted on the upper end of the space crank arms 55 (Figs. 3, 19 and 20). The forward edge of the latch plate 53 is provided with a cam surface 56 which engages an upwardly extending post 57 carried by the gripping jaw 58, to maintain the gripper in its open position, which position is illustrated in Figure 3. A spring means 59 yieldingly urges the gripping jaw 58 to rotate in a clockwise direction but is prevented from rotating the gripper by means of the engagement of the latch plate with the gripper post 57. When the operator lifts the latch plate 53 during the placing of the tie wire between the gripper jaw 58 and the second gripper anvil 60, the cam surface 56 of the plate rises clear of post 57, thus permitting the spring to rotate the gripper jaw into gripping relation with the placed tie wire. The machine is now ready to be placed into operation and, for convenience, plate 53 is also used for placing the driving clutch in operation.

Figures 19 through 22—B illustrate the preferred form of clutch and its control mechanism. It is to be understood that any form of clutch which will drive the machine through one cycle of operation and which will thereupon automatically release, may be used in place of the particular form of clutch illustrated herein. In other words, the invention is not directed to the specific form of clutch nor the means of control thereof.

Figure 21:
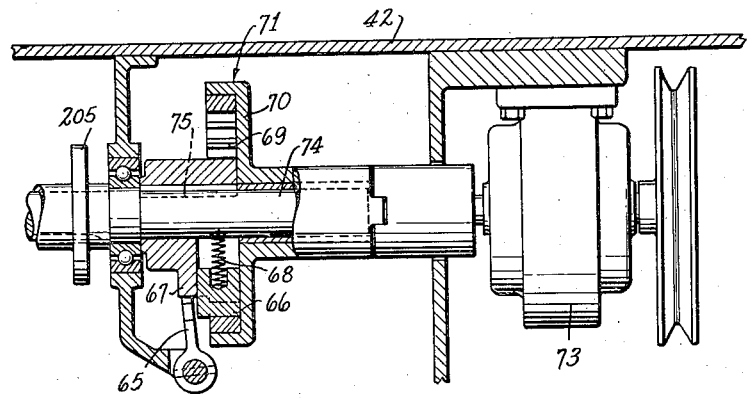
Figure 21 illustrates a fragmental sectional view taken substantially in the plane of line 21—21 of Figure 20.

The clutch control includes a train of mechanism including a link 61 pivotally connected at one end to an upturned flange of the second gripper latch plate 53 and at its opposite end to a clevis block 62 which block is pivotally mounted to one end of clutch lever 63. The opposite end of the lever 63 is connected to the frame by means of spring 64, normally acting to urge the lever to rotate in a clockwise direction as viewed in Figure 22. The lever is securely fastened onto the forward end of the clutch control shaft 64, which shaft is journaled in the frame of the tying machine and carries adjacent to inner end an upwardly directed clutch control blade 65 (Figs. 19, 20 and 21). As illustrated in Figure 19, the second gripper latch plate is in its gripper engaging position and the control blade 65 is positioned to render the clutch inactive, whereas in Figures 20 and 21 the latch plate 53 has been lifted thereby causing the clutch control shaft to rotate in a counterclockwise direction, as viewed in Figure 21, sufficiently to withdraw the control blade 65 from the clutch pawl 66. As may be observed in Figures 19, 20 and 21, the clutch pawl 66 is slidably mounted in the driven member 67 of the clutch and is yieldingly urged to move outwardly by spring means 68. As previously pointed out, the blade 65 maintains the pawl in its retracted position but as soon as the blade is removed from its supporting relation with the pawl, the pawl will move outwardly due to the influence of its spring until it engages one of the notches 69 of the clutch driving member 70, thus rendering the clutch active to drive the machine through a complete cycle of operation, and during this cycle of operation the blade will be returned to its normal position, whereupon at the completion of the cycle the pawl will engage the inclined surface of blade 65, causing the pawl to be withdrawn from engagement with one of the notches of the driving member of the clutch, thus bringing about the disengagement of the clutch. The blade 65 is provided with a stop shoulder against which the clutch pawl engages to lock the driven member of the clutch against rotation beyond this point.

The above description illustrates the manner in which the clutch is released into driving engagement and is automatically disengaged after driving the machine through one complete tying cycle. For convenience of description, the clutch will be referred to generally by reference to the numeral 71.

Clutch 71 may be driven by any suitable driving mechanism. As herein illustrated the clutch is driven by means of an electric motor 72 (Fig. 1) connected to a standard form of speed reduction mechanism 73 (Figure 21), which speed reduction mechanism is directly connected to the driving member 70 of the clutch.

It may be observed in Figure 21 that the clutch driving member 70 is journaled upon the outer end of the main drive shaft 74 of the machine, while the driven member 67 of the clutch is directly keyed to the shaft by suitable key means 75. All of the operating elements of the machine are directly driven from the main drive shaft 74 in cooperation with the cam shaft 76.

In some instances it may be preferable to mount all the operating cams of the machine directly upon the main shaft 74, however, I prefer, as herein described, to use the main shaft for carrying one set of operating cams and a cam shaft 76 for carrying a cooperating set of operating cams whereby each of the operating elements of the machine will be positively driven throughout its operating cycle by cams mounted upon the two shafts.

With the placing of clutch 71 in operation two elements start upon their operating cycles. These are the tensioning means and the outside wire clamping means, as will be noted by referring to the cam chart illustrated in Figure 32. The tensioning means includes a pair of spaced arms 77 and 78 (Figs. 3, 8 and 28) which are pivotally connected at their rear ends to the frame of the machine and at its forward end the arm 77 carries the first gripping means 46, while the second arm 78 carries at its forward end the second gripping means 52, whereby, as the two arms are spread apart, the tie wire placed above the article will be drawn taut or tensioned and for this purpose a pair of toggle links 79 and 80 interconnect the two arms and, in turn, the arm 79 is connected to the tensioning yoke 81, which yoke is slidably mounted upon the tensioning shaft 82. The shaft 82 is slidably mounted in the machine frame and is reciprocated forwardly and rearwardly by means of a bell crank lever 83. One arm of the bell crank lever is pivotally connected to the inner end of shaft 82 while the other arm of the bell crank lever carries a cam roller 84 (Fig. 10) arranged to play between the tensioning cam 85 and the return cam 86. The tensioning cam 85 is mounted upon the main drive shaft 74, while the return cam is mounted upon the cam shaft 76. The bell crank lever is journaled upon a suitable cross shaft 87. In Figure 10 the parts are shown in the positions they would occupy when the tensioning means has been actuated to apply tension to the placed tie wire, and it is for this reason that the cam roller 84 is in engagement with the outer concentric cam surface of the tensioning cam, while at the same time engaging the inner concentric surface of the return cam 86. Upon the completion of the tensioning operation the tensioning cam 85 will turn to present the inner or lower cam surface to the cam roller 84, while the extending or outer cam surface of the return cam 86 will engage the cam roller 84 and return the bell crank lever to its normal rest position.

As previously stated, the yoke member 81 is slidably mounted upon shaft 82 and, as may be observed in Figure 10, a tensioning spring 88 surrounds the shaft and acts between yoke 81 and an adjustable stop sleeve 89, which sleeve is screw threaded upon shaft 82 in the manner shown in Figure 10. The adjusting screw sleeve extends beyond the rear end of the tying machine and is provided with a crank handle 90 by means of which the tension of the spring may be increased or decreased to correspondingly increase or decrease the amount of tension placed on the tie wire during the tensioning operation.

With the parts as shown in Figure 10, the shaft 82 is moved forwardly carrying with it the adjusting sleeve 89. The forward motion of the sleeve is transmitted to the tension spring 88 and through this spring to the yoke 81 which, in turn, transmits the tensioning force to the toggle links 79 and 80. The application of the tensioning force to the toggle links causes the spaced arms 77 and 78 to swing about their pivots and as the free or forward ends of these levers carry the first and second grippers, which grippers, in turn, carry the free end of the tie wire and the supply portion thereof respectively, the tie wire which encircles the article will be tightly drawn about the article until the tension in the wire corresponds to the yielding force of the tension spring, whereupon further action of the tensioning device will apply but slightly additional tensioning force to the placed tie wire, the spring absorbing the additional motion of the driving mechanism for the tying means. As previously stated, the tensioning force applied to the wire may be increased or decreased by means of adjusting sleeve 89 which can be screwed further onto shaft 82 to increase the tension transmitted through the spring 88 or retracted to lessen tension applied through spring 88. It will be understood that the tension means having once been set to applying a desired degree of tension to the tie wire, that many articles may be bound with the tension so adjusted and that the tensioning means need only be readjusted when it is desired to either increase or decrease the amount of tension given to the wire for other articles to be bound.

The next element to be brought into action is the outside clamping means. The outside clamping means are illustrated in Figures 1, 2, 3, 4, 5, 6 and 7 and have for their purpose to lift the portions of the tie wire indicated at 91 and 92 into substantial engagement with the underside of the article being tied, whereby the portions 91 and 92 of the tie wire are lifted and thereby angled sufficiently with relation to the free end of the tie wire 93 on one side of the twister pinion and the supply portion of the tie wire 94 on the other side of the twister pinion (Fig. 2) to ensure the entrance of the wire spreading means between the portions of tie wire.

The function of these outside clamping means becomes especially important when binding or tying articles which have considerable width, which would cause the wire portions 91 and 92 to take such a flat angle with relation to their related wire portions 93 and 94 as to render the admission of the separator indefinite, that is, in some cases the separators would not enter between the wires in the manner previously described.

For narrow boxes the wire portions 91 and 92 will take a sufficiently steep angle to invariably ensure entry of the wire separators between these portions of the tie wire.

Figure 5:
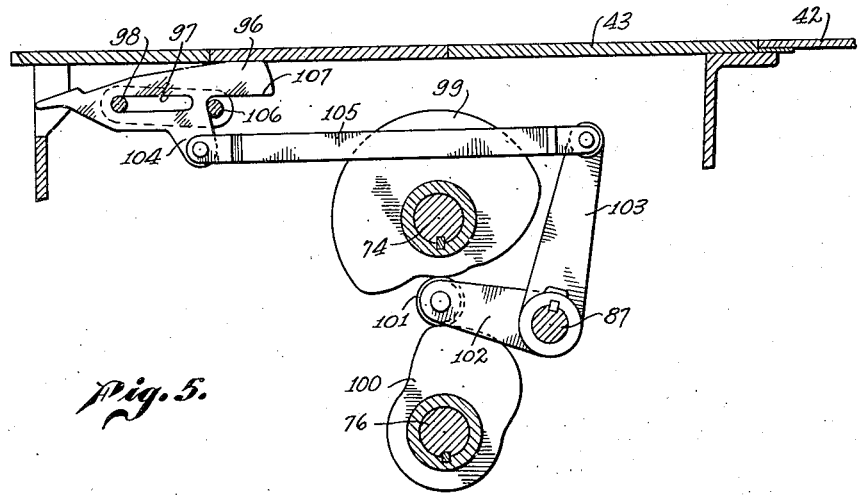
Figure 5 illustrates a fragmental sectional view taken substantially in the plane of line 5—5 of Figure 3.
Figure 6:
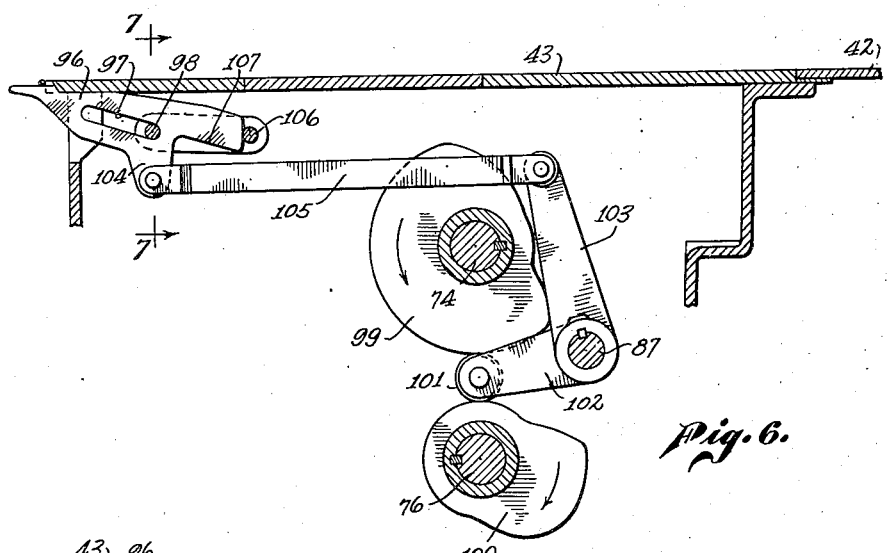
Figure 6 is substantially the same as that of Figure 5 but illustrates the parts in a different operative position.

The outside clamping means are shown in detail in Figures 4, 5, 6 and 7, and include a left hand clamping finger 95 and a right hand clamping finger 96. Each of the clamping fingers is provided with an elongated slot 97 through which a supporting pin 98 extends. The supporting pin is carried by the frame of the machine. The mechanism for advancing and retracting the right and left hand clamping fingers includes a driving cam 99 keyed to the main shaft 74, and a return cam 100 keyed to the cam shaft 76. Between these cams a cam roller 101 is maintained by means of a pair of crank arms 102 keyed to the cross shaft 87. Keyed to the cross shaft 87, in alignment with each of the clamping fingers, is a crank arm 103, the upper end of which is connected to a depending boss 104 formed on each of the clamping fingers by means of the connecting link 105. When the clutch 71 is placed in operation, causing rotation of the main shaft 74 and the cam shaft 76, the enlarged portion of the clamping finger advancing cam 99 will engage the roller 101 swinging the crank arms 102 and 103 in a counter-clockwise direction as viewed in Figures 5 and 6. This motion will be transmitted to the respective clamping fingers by means of the connecting link 105, causing the clamping fingers to advance from their retracted positions, as illustrated in Figures 4 and 5, to their active positions, as illustrated in dotted lines in Figure 4 and in full lines in Figure 6. During the outward movement of the fingers the rear end surface of each finger may cam along the under side of the cover plate of the machine and when moved to their fully extended position, the rear end of each of the fingers cams down in front of the guide pin 106. The cam fingers so positioned are illustrated in broken lines in Figure 4 and full lines in Figure 6. The downward swing of the rear end of each of the clamping fingers is caused by the end of the slot 97 formed in each of the fingers engaging the support pin 98 whereupon each of the clamping fingers will pivot about its supporting pin as a center until the forward ends of these clamping fingers engage their respective portions of the tie wire and thereby lift these portions of the tie wire into engagement with the under surface of the article.

Figure 7:
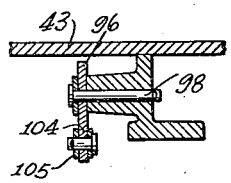
Figure 7 is a fragmental sectional view taken substantially in the plane of line 7—7 of Figure 6.

During the advancement of the clamping fingers from their retracted to their fully extended positions, the rear horizontal portion 107 cams along the guide pin 106, thus maintaining the forward end of each of the clamping fingers in its lowermost position, insuring each of the clamping fingers engaging its respective portion of the tie wire. When the slot 97 of each of the fingers engages its supporting pin 98, the portion 107 will ride beyond the guide pin 106, permitting each of the clamping fingers to pivot about its supporting pin 98, thereby elevating its respective portion of the tie wire into engagement with the under surface of the article to be tied. During the return motion of each of the clamping fingers, under the influence of its return cam 100, the rear portion will swing upwardly, pivoting about the supporting pin 98 until the surface 107 may cam along the top surface of the guide pin 106, until these clamping fingers are finally returned to their fully retracted positions, as illustrated in full lines in Figures 4 and 5. Figure 7 illustrates the manner in which the supporting pin 98 is mounted upon the frame of the machine.

The next element to be brought into operation is the shuttle of the threading device, however, the structure and operation of the threading device will be described later.

The next element to be brought into action is the projecting of the left and right hand wire spreaders 108 and 109 between the held ends of the placed tie wire. The wire spreading, severing and ejecting means are illustrated most clearly in Figures 3, 13, through 18, and include rectangular members 108 and 109 of the general form illustrated in perspective in Figure 13, one of which is placed at each side of the twister pinion 51, as may be observed most clearly in Figures 16, 17 and 18. The wire spreaders in their rest position are indicated in Figure 14, and are projected first into wire spreading position as illustrated in Figure 16, and at substantially the completion of the tying operation are retracted sufficiently to cut the free end 93 and the supply portion 94 from the tie, as illustrated in Figure 17, and upon completion of the tying operation are again advanced, as illustrated in Figure 18, to eject the completed tie from the twister pinion.

The operating means for the wire spreaders includes the advancing cam 110, keyed to the main shaft 74, and the retracting cam 111, keyed to the cam shaft 76. Between these two cams there is maintained a cam roller 112 which is carried between the lower arms of a pair of bell crank levers 113 journaled upon the cross shaft 87. Pivotally connected between the upper arms of the bell crank levers 113 is an actuated rod 114 which extends rearwardly of the machine and is provided at its extreme rear end with a threaded portion 115 upon which is slidably mounted the offset boss 116 formed at the rear end of the slide bar 117. The boss 116 is securely clamped to rod 114 by means of the adjusting nuts 118, whereby movement of the rod 114 is transmitted directly to the slide bar 117 and by means of the nuts 118 the relative position of the bar 117 may be adjusted with relation to the rod 114. The slide bar 117 is slidably mounted in the frame of the machine and is provided at its forward end with rectangular keys 119 and 120 (Fig. 18), which keys closely fit in corresponding rectangular openings 121 and 122 formed in the spreaders 108 and 109 (Fig. 18). By this arrangement of connecting the spreaders 108 and 109 to the slide bar 117, the spreaders may be readily assembled in the machine and connected to the slide bar or withdrawn therefrom without requiring the dismantling of the slide bar from the machine, and through the adjustable connection between the slide bar 117 and rod 114 the operating range of the spreaders 108 and 109 may be accurately adjusted to take up for wear and to permit adjustment in assembling the machine. The forward end of each of the spreaders is provided with a wedge-shaped portion 123 and 124. As may be observed most clearly in Figure 14, the under surface of each of the spreaders is provided with a cross notch 125. The notch 125 formed in the spreader 108 latches over the free end 93 of the tie wire adjacent to the twister pinion, while the notch 125 formed in the lower surface of the spreader 109 latches over the supply portion 94 of the tie wire and serves to hold these portions of the tie wire during the forming of the tie, and also to act as a cutter cooperating with the adjacent portion of the frame which supports the twister pinion for severing from the tie the portions 93 and 94 of the tie wire, as illustrated in Figure 17.

Figure 16:
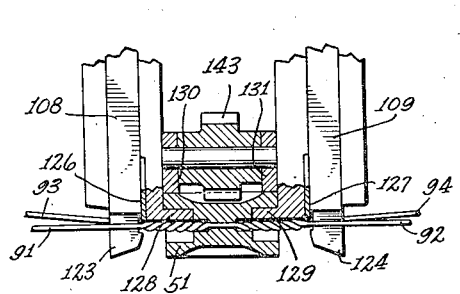
Figure 16 illustrates a fragmental view of the wire twisting mechanism illustrated in section, and its segmental supporting bearing partially in section, and a full view of the wire spreading and severing means, and shows the twister in the operation of forming a tie, the length of which tie is limited by the wire spreading means.
Figure 18:
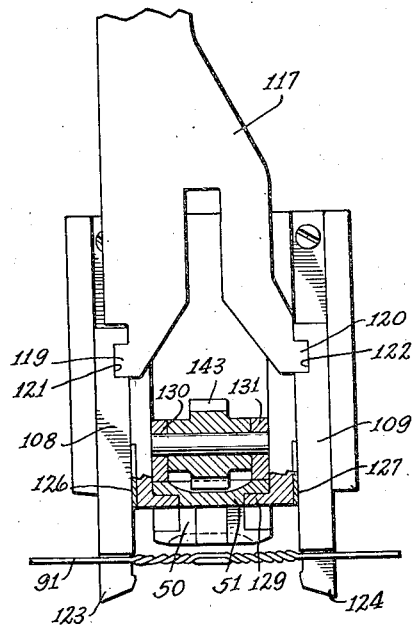
Figure 18 illustrates a view similar to Figures 16 and 17, illustrating the manner in which the wire spreading and severing means are made use of for ejecting the completed tie from the twister pinion.
Figure 17:
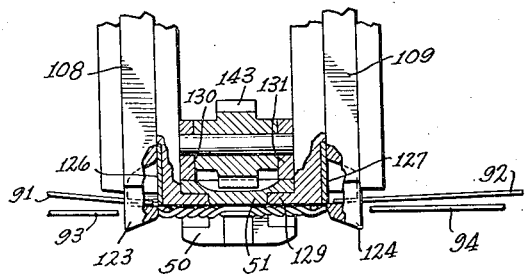
Figure 17 illustrates a view similar to that of Figure 16 but differing therefrom in showing the wire spreading and severing means partially in section and in the position occupied when severing the held end and supply portions of the tie wire from the tie.

In order to provide a hard, sharp cutting surface for the spreaders to cooperate with in serving the portions 93 and 94 from the tie, each side of the frame adjacent the spreaders is provided with especially hardened and appropriately shaped cooperative cutting edges 126 and 127, as may be observed in Figures 16, 17 and 18.

As previously pointed out, the severing of the surplus wire from the tie, namely, portions 93 and 94, is accomplished by retracting the spreaders 108 and 109 whereby the notch 125 formed in each of these spreaders cooperates with its related cutting edge 126 and 127, hereby shearing these surplus portions of the tie wire very close to each end of the tie, and upon completion of the tying operation the spreaders 108 and 109 are advanced to eject the completed tie from the slot 50 of the twister pinion, as illustrated in Figure 18. The intermittent motion given to the spreaders 108 and 109 is obtained by appropriately forming the advancing and retracting cams 110 and 111 in a manner which will be well understood.

The next element to be brought into operation is the twisting or tie forming mechanism. The tie forming mechanism includes a twister pinion 51, previously referred to, which has a wire receiving slot of the usual form. The twister pinion 51 is supported by a pair of internal segmental bearings 128 and 129 (Figs. 16, 17 and 18) and by a pair of external segmental bearings 130 and 131, also illustrated in these same figures and further illustrated in Figures 14 and 23. From these illustrations it will be noted that a full quarter segment of the twister pinion is exposed clear of any bearing surface. Referring particularly to Figures 14 and 23, it will be noted that a wire receiving slot of the twister pinion 51 is directed downwardly and is not crossed by any portion of the twister pinion supporting bearing, thus permitting the tie wire to be readily wrapped into the slot 50 of the twister pinion during the wire placing operation and due to this particular mounting of the twister pinion 51, it will be noted as, for example, in Figures 18 and 24, that when the slot 50 of the pinion is directed horizontally in its discharge position, the slot is likewise free of interference from its supporting bearing and, therefore, the completed tie may be readily ejected from the twister pinion while the slot 50 is maintained in a horizontal plane and in this way clearing the completed tie from the machine.

In Figure 16 it will be observed that each end of the twister pinion 51 is counterbored to receive the segmental bearings 128 and 129. The means for driving the twister pinion are illustrated in Figure 23 and include the driving cam 132, keyed to the main drive shaft 74, and the return cam 133, keyed to the cam shaft 76. Operatively maintained between these two cams is a cam roller 134 carried between one pair of arms 135 forming a portion of the bell crank lever 136. The bell crank lever 136 is securely keyed upon the cross shaft 137, and each of the upper arms of the bell crank lever is provided with a rack segment 138 (Figs. 3 and 23). Each of the rack segments 138 meshes with a pinion 139 keyed to a short cross shaft 140. Positioned between the pinion 139 is a spur gear 142 which may be formed integral with the pinion 139 or keyed directly to shaft 140. An idler gear 143 transmits the motion from the spur gear 142 to the twister pinion 51. By the twister pinion operating mechanism just described, the twister pinion is turned through a predetermined number of revolutions to form the tie between the wire portions 91, 92, 93 and 94, as illustrated in Figure 16, and in the operation of the twister pinion it is actuated to release the twist slightly and then to give the wire an overtwist and finally turn until the slot 50 is directed in a horizontal plane (Figs. 17, 18 and 24), whereupon the spreaders 108 and 109 are actuated to eject or discharge the completed tie from the twister pinion in the manner previously described.

As will be remembered from the description of the twister pinion operating mechanism, the cross shaft 137 is keyed to the bell crank lever 136 and is rotated thereby and the operation of the shaft 137 is made use of to provide means for locking the tensioning mechanism from jumping ahead under the influence of its tension spring 88 when the held ends 91 and 94 of the tie wire are severed. This locking means provides a pair of lever arms 144 and 145, as illustrated in Figures 3, 9, 19, 25, 30 and 31. Each of these levers is journaled upon the opposite ends of shaft 137, which shaft it will be remembered is actuated by the twister pinion driving mechanism. Keyed securely to the shaft, adjacent each of the lever arms 144 and 145, is a collar 146 carrying a dog 147 (Figs. 9 and 25) and each of the lever arms 144 and 145 is provided with an inwardly projecting boss 148 arranged to be held in engagement with its related collar dog 147 by spring means 149 (Figs. 9 and 19). Due to this arrangement, as the shaft 137 rotates in a clockwise direction, as viewed in Figure 9, which rotation is in a counter-clockwise direction as viewed in Figure 19, or in a direction toward the lower portion of the sheet upon which the Figure 25 appears, the lever arms 144 and 145 will follow. The rotation of levers 144 and 145 will continue until the wedge-shaped portion 150, formed at the upper free end of each of the levers, wedges between the frame and arcuate bearing surface formed upon each of the gripper arms 77 and 78 (Figs. 8 and 9).

If desired, the frame surface 151 (Fig. 8) may be provided with a resilient friction material 152 to act as a breaking surface to prevent the lever arms 144 and 145 from being thrust backwardly when the cutting action takes place and the gripper arms 77 and 78 are free to move outwardly under the influence of the tension spring 88. It will be understood that shortly after the severing operation has taken place that the tensioning means will be returned to its rest position, whereby the gripper arms 77 and 78 will be returned to their respective positions, as illustrated in Figure 3. It will be understood that as soon as the wedge-shaped portions 150 of each of the lever arms 144 and 145 engage the arcuate surface of their respective gripper levers 77 and 78, that further rotation of the lever arms 144 and 145 will cease and this may take place without interfering with the normal rotation of the shaft 137 during the twisting operation. The additional rotation of shaft 137 will carry the collar dog 147 clear of engagement with the inwardly extending boss 148 carried by each of the levers 144 and 145, and upon return rotation of shaft 137 the dogs 147 will engage the bosses 148 to return the lever arms 144 and 145 to their retracted positions.

Shortly before the completion of the tying operation, mechanically operated means are provided for opening the first and second grippers. This means includes a cam 155 (Figs. 3, 25, 29, 30 and 31) securely keyed upon cam shaft 76. Cooperating with cam 155 is cam roller 156, carried between a pair of spaced arms 157, which arms are secured to opposite sides of the crank arm 158 (Fig. 25). The crank arm 158 is securely keyed to the cross shaft 159. A second crank arm 160 is spaced from the first crank arm 158 and, if so preferred, it may be formed integral therewith. At any event, the crank arm 160 is similar to the crank arm 158 in that it is also keyed securely to the cross shaft 159. At the upper end of the crank arms 158 and 160 is pivotally mounted the first gripper latch plate 161. The latch plate 161 is yieldingly urged by spring means 162 to bring the forward edge of the latch plate into sliding engagement with the top surface of the gripper lever 77. Figure 8 illustrates the position of the latch plate 161 with relation to the gripper jaw post 163 when the plate has been lifted sufficiently to move clear of its engagement with the gripper jaw post, thereby releasing the gripper jaw 48 for movement under the influence of its spring 164 for gripping the free end of the wire 91 between the gripping surface of the jaw and the gripper anvil 47.

Figures 28 and 29 illustrate the first gripper latch plate 161 in its fully retracted position, in which position the cam surface 165 has moved back clear of the gripper post 163, whereby during its forward movement the cam surface 165 will engage the gripper jaw post and swing the gripper to its open position. The open position of the gripper is illustrated in Figure 30, wherein it will be noted that the cam surface 165 is lodged directly in back of the gripper post 163. Upon the opening of the first gripper, which closely follows the severing of the wire ends from the tie, the cut end will fall, due to gravity, from its position within the gripper.

The same operating mechanism is made use of for opening the second gripper and for this purpose the cross shaft 159 extends across the machine and upon its opposite end is securely keyed a double crank arm 55. Between the crank arms 55 is journaled the second gripper latch plate 53. Referring to Figures 20 and 22—B, the latch plate 53 is illustrated as it would appear after the second gripper has been released by lifting the forward end of the latch plate to permit the second gripper jaw to swing into gripping engagement with the supply portion 94 of the tie wire. As the crank arms 55 are keyed to shaft 159, the rotation of the shaft in a clockwise direction, as viewed in Figures 19 and 20, will retract the cam edge 56 of the latch plate 53 until it has passed beyond this gripper post and will, therefore, drop down behind the gripper post 57 preparatory to the forward motion of the latch plate. This position is illustrated in Figure 19. Upon the return swing of the crank arms 55, the latch plate cam surface 56 will engage the gripper post 57 and will thereby swing the gripper jaw to its open position and will thus hold the gripper open until the latch plate is again lifted during the placing of the next tie wire within the second gripper.

The retraction of the gripper plate 53 by means of crank arm 55 serves a further purpose during the operating cycle of the machine, namely, by permitting the latch plate 53 to ride down off of the top of the second gripper post 57, thereby permitting the clutch control link 61 to return the clutch control blade 65 to its clutch disengaging position, whereby upon the completion of the operating cycle the clutch will be automatically disengaged in a manner previously set forth.

To ensure the correct functioning of the second gripper latch plate 53, a spring 166 yieldingly acts to urge the forward end of the latch plate into engagement with the top surface of the gripper lever 78 in which position, upon its forward movement, it will engage the second gripper post 57 to bring about the opening of the gripper and thereby the release of the portion 94 of the supply wire held by the second gripper.

Means are provided, which are herein referred to as the threading device, for taking hold of the supply portion of the tie wire 94 just prior to the release of this portion of the tie wire from the second gripper and conveying this portion of the tie wire to the first gripper in order to prepare the machine for the next cycle of operation. The threading device includes a carriage 170 slidably mounted in the frame of the tying machine, as is clearly illustrated in Figures 1, 2, 23, 24, 26, 27 and 30 and 31. The carriage 170 carries the threading mechanism and is illustrated in its normal rest position in Figure 2, and in Figure 1 it is shown just after it has taken hold of the supply portion 94 of the tie wire and is in the act of carrying this portion of the wire to present the cut end thereof to the first gripper. A shuttle 171 is slidably mounted through the carriage and is generally directed in an upwardly direction, as illustrated in Figures 30 and 31. The mechanism for advancing and retracting the shuttle through the carriage bore includes a hinge block 172 which is pivotally connected to a crosshead 173 slidably mounted upon the guide rod 174. The pivotal connection between the hinge block 172 and the crosshead 173 is indicated at 175 (Fig. 25). The guide rod 174 is carried at each end upon the forward or free ends of two pairs of lever arms 176 and 177, while the rear ends of these lever arms 176 and 177 are journaled upon the cross shaft 87. Intermediate the ends of each pair of lever arms 176 and 177, there is journaled a cam roller 178 (Fig. 25). Cooperating with each of the cam rollers, there is mounted upon the main drive shaft 74 a retracting cam 179, and upon the cam shaft 76 a cooperating advancing or elevating cam 180. Through the actuation of the cams 179 and 180, one pair of these cams for each pair of lever arms 176 and 177 will operate to raise and lower the guide rod 174, which guide rod interconnects the free ends of the lever arms 176 and 177 and, through the connection formed by the cross head and hinge block, the shuttle 171 of the threading device will be advanced or retracted in the manner desired independently of the position of the carriage along its line of travel.

The means for advancing the carriage from its rest position, as shown in Figure 2, to that of Figure 1 and back to its rest position in Figure 2, includes the following train of mechanism which derives its driving force from the tying mechanism.

As will be remembered during the description of the driving means for the twister pinion 51, the shaft 140 was driven through suitable key means from the rotation of the pinion 139. The rotation of this shaft during the twisting operation is made use of for reciprocating the carriage 170 from its rest position, as shown in Figure 2, to its extreme right hand position, as shown in Figure 1, then back to its rest position in Figure 2. For this purpose the right hand end of shaft 140 is provided with a bevel gear 181, which bevel gear cooperates with a bevel gear 182. Preferably formed integral with the bevel gear 182, but spaced below the bevel gear 182, is a mutilated gear 183. The bevel gear 182, together with its mutilated gear 183, are journaled upon a diagonally arranged shaft 184 suitably mounted in appropriate bosses formed in the machine frame. The upper edge of the carriage 170 is provided with rack teeth 185 (Figs. 24, 26 and 27). In Figure 27 the mutilated gear 183 and the carriage 170, with its rack 185, are illustrated in their normal rest position, in which position the teeth of the mutilated gear 183 engage the last tooth of the carriage rack 185 and during the tying operation the mutilated gear 183 will rotate in a counter-clockwise direction to drive the carriage to the right, as viewed in Figure 26, until the carriage has reached the extreme end of its travel to the right, whereupon the teeth of the mutilated gear will turn out of mesh with the teeth of the rack, permitting a further rotation of the mutilated gear without causing further travel of the carriage. Positioned directly below and connected to the mutilated gear 183 is a single gear tooth 186, which is arranged to engage a shoulder 187 formed below the rack teeth 185 of carriage during the rotation of the mutilated gear in a clockwise direction and the engagement of the single tooth 186 with its cooperating shoulder 187 takes place just after the blank portion 188 of the mutilated gear has turned out of mesh with the last tooth of the carriage rack and serves to advance the carriage toward the left to bring the gear teeth of the mutilated gear into mesh with the carriage rack 185, whereupon during this return rotation of the mutilated gear, the carriage will be returned to its rest position as illustrated in Figure 26. It is during this return travel of the carriage that the gripping means carried by the carriage shuttle transports the cut end 94 of the supply wire and presents it to the first gripper. It is necessary to first lower the shuttle so that the gripping means carried thereby will not strike the twister pinion and its supporting mechanism during the travel of its carriage from the left hand position, as shown in Figure 26, to its right hand position, as shown in Figure 27, and thereafter to elevate the shuttle 171 to place the gripping means into engaging relation with the tie wire just prior to the severing operation and to thereafter lower the shuttle, together with its gripping means, in order that these parts may travel under the tying mechanism and to again elevate the shuttle with its gripper in order to present the end of the tire wire to the first gripper.

The means for elevating the shuttle includes the hinge block 172 and the cross head 173 which slides freely upon the guide rod 174, which guide rod is raised and lowered by the cam means and levers previously described.

The gripping means carried by the shuttle includes a fixed jaw 190, located upon the upper end of the shuttle 171 (Figs. 24, 30 and 31). The active jaw of the shuttle gripping means is indicated at 191 and is pivoted to the fixed jaw. The active jaw is yieldingly urged into gripping relation with its cooperating fixed jaw by a compression spring 192 (Figs. 30 and 31) acting between the shoulder 193 formed in the counterbore portion of the shuttle 171 and a plunger 194 slidably mounted in the shuttle bore, which plunger is operatively connected to the lower arm 195 of the active gripper jaw by means of the link 196. Means are provided for mechanically opening the active gripper jaw 191 against the action of the spring 192, which means may include providing the plunger 194 with the rod 197 which extends through the shuttle 171 and is provided at its lower end with a right angular portion 198. In order to maintain the right angular portion 198 of the rod directed forwardly, this portion is arranged to slide in a groove formed in the lower end of the shuttle, as illustrated in Figures 30 and 31. The angular portion 198 of the rod extends beyond the diameter of the shuttle to permit a yoke 200 (Figures 25, 30 and 31) to engage with the portion 198 of the rod at any position of the carriage along its course of travel, however, it is only necessary to engage this portion of the rod to open the shuttle gripper at each end of the carriage stroke. It is necessary to bring about the opening of the shuttle gripper just after the threading mechanism has presented the cut end of the wire to the first gripper and after the first gripper has taken hold of the wire presented thereto in order to release the shuttle gripper from that portion of the wire now engaged by the first gripper and, secondly, it is necessary to open the shuttle gripper when the carriage is moved to its extreme right hand position, as illustrated in Figure 27, prior to the elevation or lifting of the shuttle to engage and take hold of the portion 94 of the tie wire prior to the severing of this portion of the tie wire from the completed tie.

As may be observed most clearly in Figure 25, the yoke 200 is securely fastened to and between two pair of lever arms 201 and 202. The lever arms 201 and 202 are journaled upon the cross shaft 137 and extend rearwardly to provide supporting means for the cam rollers 203 and 204 (Fig. 25). The cam rollers 203 and 204 are each operated upon by two cams (Fig. 24). The shuttle elevating cams 205 are securely keyed upon the main drive shaft 74 in alignment with the respective cam rollers 203 and 204, while the shuttle lowering cams 206 are keyed upon the cam shaft 76 (Figs. 24 and 25). The cams 205 and 206 for each of the rollers 203 and 204 are cooperatively related for swinging the lever arms 201 and 202 about the axis of shaft 137 for raising and lowering the yoke 200 and thereby to open the shuttle gripper or to permit the shuttle gripper to be closed under the influence of its spring means 192 to take hold of the portion 94 of the tie wire just prior to the severing operation, or to release the wire after it has been gripped by the first gripper.

Figure 30 illustrates the yoke 200 elevated clear of the angular portion 198 of the gripper control rod 197 to permit the shuttle gripper to close upon the tie wire, while in Figure 31 the yoke 200 is shown as it would appear when engaging the angular portion 198 of the gripper control rod 197 to actuate the gripper to its open wire releasing position.

The threading device is arranged to align the shuttle gripper with the supply portion 94 when moved to engage this portion of the wire just prior to the severing operation and to turn during the travel of the carriage to present the cut end of the wire to the second gripper.

As may be observed in Figure 8, the tie wire portion 94 extends from the twister pinion to the second gripper in angular relation to the normal plane of the tie wire placed above the object, and also the portion 91 of the tie wire extending from the twister pinion to the first gripper extends at a sharper angle from the plane of the placed tie wire. The turning movement given to the shuttle gripper is to align the gripper with these angular portions of the tie wire. The turning of the shuttle is obtained through its hinged connection with the cross head 173 in combination with the angular relation of the line of travel of the carriage 170 to the axis of the guide rod 174. In this connection attention is directed to Figure 25 wherein the angular turning of the shuttle will be observed by comparing the full line position of the shuttle hinge block 172 at the right side of the figure, as compared to the broken line position of the hinge block at the left side of the figure. Figures 26 and 27 show the angular relation of the threading device carriage 170 to the longitudinal axis of the machine. The relation of these parts are proportioned to align the shuttle gripper jaw with the wire portion 94 just prior to the severing operation and to turn through an angle for presenting the cut end of the wire at the shuttle. If this turning operation were not provided for, it would be almost impossible to ensure the presentation of the cut end of the tie wire to the first gripper during the threading operation.

Means are provided for automatically releasing the first gripper when the cut end of the tie wire is presented thereto. This means includes providing a tripping plunger 205 (Figs. 30 and 31) which is slidably mounted in the machine frame and extends generally in an upwardly direction more or less parallel to the vertical axis of the shuttle. In Figure 30 the tripping plunger is shown in its retracted or inactive position wherein the cotter pin 206 carried by the upper end of the plunger is in contact with the upper plunger supporting bearing to maintain the plunger in its retracted position. The cross head 173 is provided with a rearwardly extending shoulder 207 arranged to engage the lower end of the tripping plunger when the cross head is elevated, as shown in Figure 31. The rise of the cross head also acts through the hinge block to elevate the shuttle gripper to present the cut end of the tie wire to the first gripping means whereby, as soon as the wire is presented to the first gripper, the tripping plunger will engage and lift the first gripper latch plate 161 clear of the gripper post 163, thereby releasing the jaw 48 to swing into gripping relation with the presented end of the tie wire. It is shortly after this operation has taken place that the yoke 200 is brought into engagement with the angular portion 198 of the shuttle gripper control rod 197 to open the shuttle gripper and thereby release the held portion of the tie wire. The machine has now completed its cycle of operation and will be brought to rest by the engagement of the clutch pawl 66 with the clutch control blade 65 in the manner previously described. In order to absorb the shock caused by the engagement of the pawl with the shoulder of the clutch blade, it is preferable to provide a spring means 208 (Figs. 19 and 20) mounted upon the clutch control shaft 64 and acting between one of the shaft supporting bearings and a collar 209 fixedly mounted upon the shaft. The control shaft is permitted a limited longitudinal motion as determined by the length of the space formed between the shaft bearings 210 and 211 and the length of the clutch control blade 65 (Figs. 19 and 20). The spring 208 normally maintains the clutch control blade in contact with bearing 210 and movement of the blade from the bearing is resisted by the spring until the blade reaches bearing 211, whereupon the blade, together with the clutch mechanism, will be brought to a positive stop, the spring acting during this movement to cushion the stopping force of the machine.

Although it is not necessary, it is preferable to inclose the operating parts of the machine in an oil-tight casing 212, as illustrated in several figures of the drawings.

It is also desirable to positively drive the cam shaft 76 and for this purpose gears 213 and 214 are provided (Fig. 24).

The upper front face of the supporting table 41 may be provided with an apron 215 which may be of any suitable or appropriate form to more or less enclose the forward portions of the machine and to assist the operator in looping or placing the tie wire about the article to be tied. A further feature which also assists in the placing of the tie wire is the placing of the first and second grippers rearwardly of the wire receiving slot 50 of the twister pinion. This relation is clearly shown in Figure 8, and materially contributes to the ease and positive operation of the machine.

In the preferred embodiment of the machine an interlock is provided to prevent the placing of the machine in operation by the lifting of the second gripper latch plate 53 unless the tie wire has been placed in this gripper. It will be understood that this interlock need not be incorporated in the machine unless it is desired to do so. The interlock includes providing the clutch control link 61 with an offset bracket 216 (Figs. 22, 22—A and 22—B) arranged below the jaw. As the latch plate 53 is raised, the clutch control link with its offset bracket 216 will follow, and with the continued lifting of the latch plate the second gripper will be released by the plate moving out of contact with the post 57, permitting the gripper jaw to swing into gripping relation with the tie wire placed within the second gripper. The parts so positioned are illustrated in Figure 22—B wherein it will be noted that the latch plate may be further raised, during which the offset bracket 216 will clear the arm 217 of the gripper, thereby permitting the clutch to be placed into operation. However, should the latch plate 53 be raised without having first placed the tie wire within the gripper, upon release of the gripping jaw 58 by the lifting of the cam surface 56 of the plate clear of the gripper post 57, the jaw will rotate considerably further, that is, until its wire engaging surface contacts the gripper anvil. This additional movement of the gripper jaw brings the gripper arm 217 directly above the offset portion 216, thus preventing the plate from being lifted sufficiently to place the clutch in operation as the offset bracket 216 will engage the arm 217 of the gripper before the release of the clutch has been brought about.

Having fully described the invention, it is to be understood that it is not to be limited to the details herein set forth, but the invention is of the full scope of the appended claims.

I claim:

1. In a tying machine threading device, a carriage having a predetermined path of travel, means operable for driving the carriage back and forth along its predetermined path of travel once during each operating cycle of the machine, a shuttle slidably carried by the carriage, means for sliding the shuttle back and forth through the carriage, a relatively fixed jaw carried by the shuttle, a relatively movable jaw carried by the shuttle, spring means for yieldingly maintaining said movable jaw in gripping relation with said fixed jaw, and means operable for actuating the movable jaw against the action of its spring means for retracting said jaw from the fixed jaw to receive or discharge the tie wire.

2. In a tying machine threading device, a carriage having a predetermined path of travel, driving means for the carriage, a shuttle journaled to the carriage for independent sliding and oscillatory motions, wire gripping means carried by the shuttle, means for advancing and retracting the shuttle, and means connecting the shuttle to its advancing means and said connecting means being arranged to cause an oscillatory movement of the shuttle during the travel of the carriage for aligning the shuttle gripping means with a portion of the tie wire to be gripped during the advancement of the shuttle.

3. In a tying machine threading device, a reciprocatory carriage, means for reciprocating the carriage, a shuttle mounted upon said carriage for oscillatory motion, wire gripping means carried by the shuttle, a guideway angularly related to the line of travel of the carriage, and means connecting the shuttle to the guideway for causing an oscillatory movement of the shuttle during the travel of the carriage for aligning the shuttle gripper with a portion of the tie wire to be gripped thereby.

4. In a tying machine threading device, means for gripping the free end of a tie wire, a reciprocatory carriage, a shuttle mounted upon said carriage for oscillatory motion, wire gripping means carried by the shuttle, a guideway angularly related to the line of travel of the carriage, and means connecting the shuttle to the guideway for causing an oscillatory movement of the shuttle during the travel of the carriage for aligning the shuttle gripper with a portion of the supply wire to be gripped thereby at one carriage position and for aligning the shuttle gripper with the first mentioned gripping means at a second carriage position.

5. In a tying machine, carriage means operable through a predetermined path of travel, shuttle means operatively carried by the carriage, gripping means carried by the shuttle, spring means operable for normally maintaining the shuttle gripper closed, and means operable independent of the position of the carriage along its line of travel for actuating the shuttle gripper to its open position.

6. In a tying machine, carriage means operable through a predetermined path of travel, shuttle means operatively carried by the carriage, means for operating the shuttle independent of the movement of the carriage, gripping means carried by the shuttle, spring means operable for normally maintaining the gripper closed, and means operable independent of the movement of the carriage for actuating the gripper to its open position.

7. In a tying machine, a pair of spaced grippers, tying means located between said grippers in advance thereof, severing means for cutting the completed tie from the free and supply portions of the tie wire, threading means for taking hold of the supply portion of the tie wire prior to the severing operation and after the severing operation for presenting the cut end thereof to said first gripper, and means for aligning the threading means first with the supply portion of the tie wire extending from the tying means to one of the grippers and second with the other of said grippers as the held end of the tie wire is presented by the threading means to said other gripper.

8. In a tying machine, tying means, a gripper located adjacent one end of said tying means, severing means for cutting the completed tie from the supply portion of the tie wire, threading means for gripping the supply portion of the tie wire extending from the end of the tying means opposite to the location of said first mentioned gripper, and means for operating the threading means for presenting the supply portion of the tie wire cut from the tie by the severing means to the first mentioned gripper.

9. In a tying machine, gripping means yieldingly maintained closed, means for releasably latching the gripper open, a threading device operable for conveying and presenting the cut end of the supply portion of the tie wire to the gripper, and means actuated in timed relation with the presentation of the cut end of the tie wire to the gripper for automaticaly releasing the gripper latching means.

10. In a tying machine, gripping means yieldingly maintained closed, means for automatically opening the gripper at the completion of a tying operation, means for latching the gripper in its open position, a threading device operable upon the completion of the tying operation for presenting the cut end of the supply portion of the tie wire to the opened gripper, and means actuated in timed relation with the presentation of the cut end of the tie wire to the opened gripper for automaticaly tripping the gripper latch.

11. In a tying machine, a gripper yieldingly maintained closed, means for automaticaly opening the gripper at substantially the completion of the tying operation, means for latching the gripper open, severing means for cutting the completed tie from the supply portion of the tie wire, threading means operable for taking hold of the supply portion of the tie wire prior to the severing operation and thereafter operable for conveying and presenting the cut end of the tie wire to the opened gripper, and means actuated in timed relation with the presentation of the tie wire to the gripper for tripping the gripper latch.

12. In a tying machine, tying means, gripper means angularly related to the tying means and yieldingly maintained closed, means for automatically opening the gripper, means for latching the gripper in its open position, severing means, threading means for taking hold of the supply portion of the tie wire in angular relation to the tying means and at the side of the tying means opposite to the location of the gripper means, means for actuating the threading means to convey and present the cut end of the tie wire after the severing operation to the latched open gripper, and means for tripping the gripper latch when the cut end of the tie wire is presented thereto.

13. In a tying machine, tying means, gripper means angularly related to the tying means and located in spaced relation adjacent one end thereof, gripper opening and latching means operable upon the securing of the tie, severing means, threading means for taking hold of the supply portion of the tie wire in angular relation to the tying means and at the side of the tying means opposite to the location of the gripping means, means for actuating the threading means to convey the cut end of the tie wire after the severing operation to the opened gripper, means for turning the threading means to align the cut end of the tie wire with the opened gripper and for presenting the aligned tie wire end thereto, and means for automaticaly tripping the gripper latch when the tie wire end is presented to said gripper.

14. In a tying machine, tying means, gripping means angularly related to the tying means and located in spaced relation adjacent one end thereof, severing means, threading means for taking hold of the supply portion of the tie wire in spaced relation to the end of the tying means opposite to that of the gripping means, means for actuating the threading means to convey the cut end of the tie wire after the severing operation to the gripper, means for turning the threading means to align the cut end of the tie wire with the gripper, and means for automatically opening the gripper to receive the tie wire end presented thereto by the threading means and for releasing the gripper into holding relation with the presented end of the tie wire.

HERBERT HARVEY.